(12) United States Patent
Zhang et al.

(10) Patent No.: US 7,297,656 B2
(45) Date of Patent: Nov. 20, 2007

(54) PARTICULATE FILTER AND METHOD FOR TREATING SOOT

(75) Inventors: Wenzhong Zhang, Savage, MN (US); Karl C. C. Kharas, Tulsa, OK (US)

(73) Assignee: Umicore AG & Co. KG, Hanau (DE)

( * ) Notice: Subject to any disclaimer, the term of this patent is extended or adjusted under 35 U.S.C. 154(b) by 673 days.

(21) Appl. No.: 10/735,035

(22) Filed: Dec. 12, 2003

(65) Prior Publication Data

US 2004/0126287 A1 Jul. 1, 2004

Related U.S. Application Data

(63) Continuation-in-part of application No. 10/127,252, filed on Apr. 22, 2002, now Pat. No. 6,764,664.

(51) Int. Cl.
*B01J 23/42* (2006.01)
(52) U.S. Cl. ..................................... 502/339
(58) Field of Classification Search ............... 502/325, 502/328, 330, 339, 344, 355; 423/215.5, 423/213.2, 213.5
See application file for complete search history.

(56) References Cited

U.S. PATENT DOCUMENTS

| | | | | |
|---|---|---|---|---|
| 4,515,758 A | 5/1985 | Domesle et al. | ......... | 423/213.2 |
| 5,614,596 A | 3/1997 | Laine et al. | ................. | 525/389 |
| 5,853,675 A | 12/1998 | Howorth | ...................... | 422/179 |
| 5,939,354 A | 8/1999 | Golden | ...................... | 502/525 |
| 5,977,017 A | 11/1999 | Golden | ...................... | 502/525 |
| 6,013,599 A | 1/2000 | Manson | ...................... | 502/340 |
| 6,248,689 B1 | 6/2001 | Manson | ...................... | 502/340 |
| 6,352,955 B1 | 3/2002 | Golden | ...................... | 502/302 |
| 6,372,686 B1 | 4/2002 | Golden | ...................... | 502/302 |
| 6,764,664 B2 * | 7/2004 | Zhang | .................... | 423/215.5 |

OTHER PUBLICATIONS

Joint Commitee of Pwder Diffraction Standards (JCPDS), International Center for Diffraction, Card No. 29-0820, 2 pages.
K.F. Waldner, et al., "Synthesis of a Double Alkoxide Precursor to Spinal (MgAl2O4) Directly from Al(OH)3, MgO, and Triethanolamine and Its Pyrolytic Transformation to Spinel", Received Aug. 25, 1995, Chem. Mater., vol. 8, No. 12, 1996, pp. 2850-2857.
H.R. Hoekstra, et al., "Synthesis of Some Pyrochlore-Type Oxides of Platinum (IV) at High Pressure", Received Jul. 11, 1968, Inorganic Chemistry, vol. 7, No. 12, Dec. 1968, pp. 2553-2557.
Y. Nishihata, et al., "Self-regeneration of a Pd-perovskite catalyst for automotive emissions control", Letters to Nature, vol. 418, Jul. 11, 2002, pp. 164-167.
Magdalena Helmer, "Cleaning up Catalysts", Nature, vol. 418, Jul. 11, 2002, p. 138.

* cited by examiner

*Primary Examiner*—Edward M. Johnson
(74) *Attorney, Agent, or Firm*—Robert G. Weilacher; Smith, Gambrell & Russell, LLP

(57) ABSTRACT

In one embodiment, a particulate filter includes a housing and a substrate disposed within the housing, the substrate comprising a catalyst composition comprising a single crystalline phase multiple metal oxide comprising platinum, wherein the substrate is designed such that gas flowing through the substrate, passes through a walls in the substrate prior to exiting the substrate.

22 Claims, 4 Drawing Sheets

PARTICULATE FILTER AND METHOD FOR TREATING SOOT

CROSS REFERENCE TO RELATED APPLICATIONS

The present application is a continuation-in-part application of U.S. patent application Ser. No. 10/127,252, filed Apr. 22, 2002, now U.S. Pat. No. 6,764,664 which is hereby incorporated by reference in its entirety.

TECHNICAL FIELD

This disclosure relates to the purification of contaminants and particulates from exhaust gases. More particularly, this disclosure relates to a catalyst composition for exhaust gas purification, including soot combustion.

BACKGROUND OF THE DISCLOSURE

In order to meet exhaust gas emission standards, the exhaust emitted from internal combustion engines is treated prior to emission into the atmosphere. Exhaust is passed through a catalytic element to remove undesirable gaseous emission components such as unburned hydrocarbons, carbon monoxide and nitrogen oxides. In addition to the gaseous components, exhaust gases also contain particulate matter such as carbon-containing particles or soot. A particulate filter, also commonly used with compression ignition engines, is used to prevent soot, or carbon particles, from exiting the tailpipe. Carbon particles are stored in the filter and then burned so that the filter is regenerated and able to again store the carbon particles. In a passive diesel particulate filter, the filter becomes so filled with particulate matter that the heat accumulated due to increased vehicle speed or load raises the temperature of the carbon to a temperature at which it ignites.

In the process to develop a catalyzed diesel particulate filter, it has been shown that eutectic salts such as $KVO_3$ (potassium vanadate) and $CsVO_3$ (cesium vanadate) are efficient diesel soot oxidation catalysts that provide lower soot ignition temperatures and higher soot combustion rates than other catalysts. These eutectic salts perform well as catalysts because of their low melting points, 520° C. for $KVO_3$ and 641° C. for $CsVO_3$ (see, for example, U.S. Pat. No. 4,515,758 to Domelse et al.). The low melting temperature of the eutectic salts causes them to be partially melted when the soot burns and this partial melting results in more efficient contact with the soot and thus efficient combustion. The low melting point of these eutectic salts, however, causes them to have high mobility when coated on a wall-flow diesel particulate filter. Under diesel engine exhaust treatment conditions, lack of durability as evidenced by loss of adhesion of the catalyst is a significant problem.

There thus remains a need for catalyst formulations for catalyzed diesel particulate filters that have good catalytic properties and low soot ignition temperatures.

The above described and other features are exemplified by the following figures and detailed description.

SUMMARY OF THE DISCLOSURE

Disclosed herein are particulate filters and methods for treating soot. In one embodiment, a particulate filter includes a housing and a substrate disposed within the housing, the substrate comprising a catalyst composition comprising a single crystalline phase multiple metal oxide comprising platinum, wherein the substrate is designed such that gas flowing through the substrate, passes through a walls in the substrate prior to exiting the substrate.

In one embodiment, the process for treating soot comprises: introducing a gas stream comprising soot to the particulate filter and passing the gas stream through the substrate, and removing soot from the gas stream. This gas stream passes through a wall in the substrate and contacts the catalyst composition prior to exiting the substrate.

The above described and other features are exemplified by the following figures and detailed description.

BRIEF DESCRIPTION OF THE DRAWINGS

Refer now to the figures wherein the like elements are numbered alike therein.

DETAILED DESCRIPTION

Figure 1:
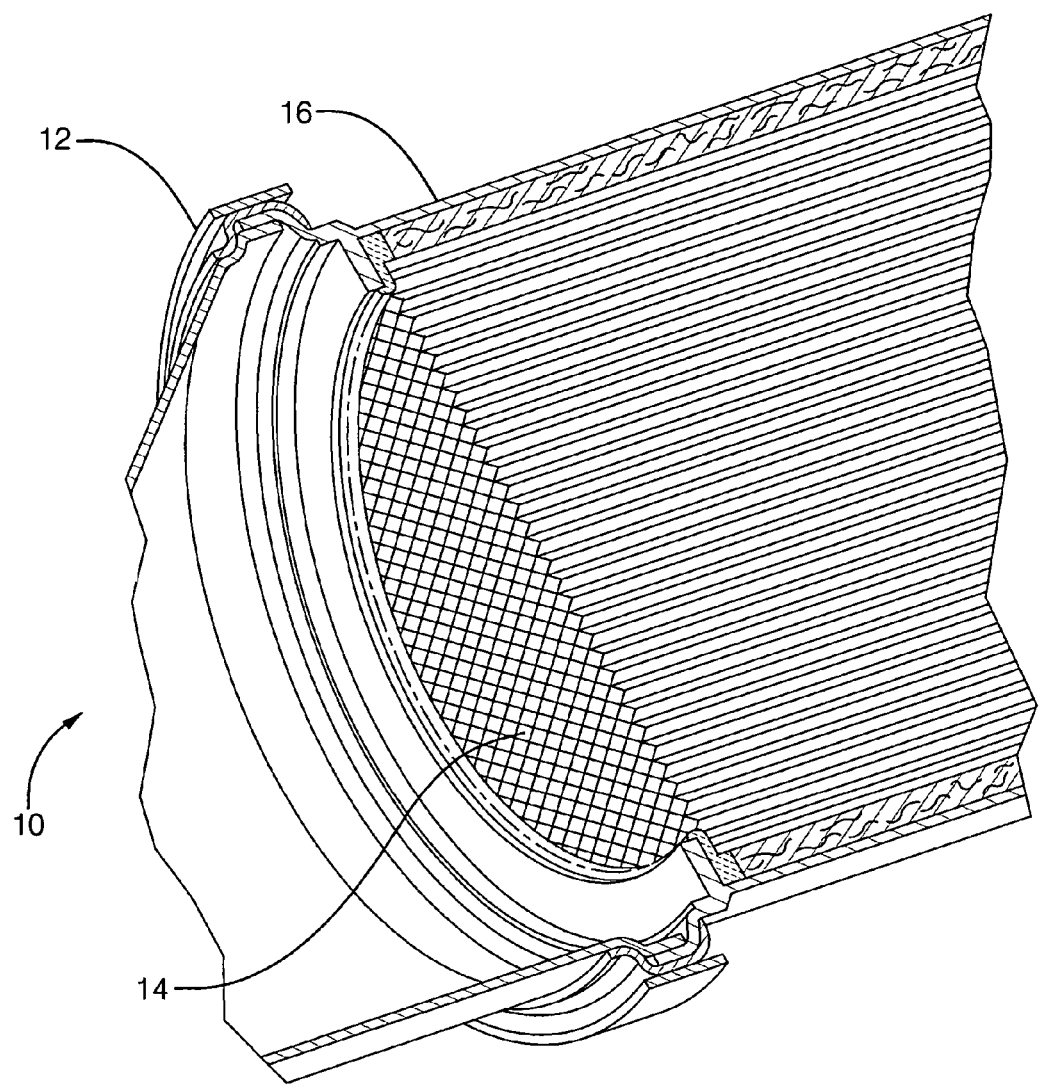
FIG. 1 is a partially cut-away cross-sectional perspective view of a catalyzed diesel particulate filter.

A particulate filter element (PF) (e.g., diesel particulate filter (DPF)) is a structure in which particulate emission components such as soot are trapped and combusted. The filter comprises a housing with a substrate disposed therein. The substrate comprises a catalyst composition and has passages such that gas entering the inlet of the housing enters inlet passages, passes through the substrate wall and exits the substrate through exit passages, thereby forcing the gas to contact the catalyst composition disposed on and/or in the walls. The catalyst composition for purification of gases, e.g., exhaust gases, comprises a substrate and a catalyst composition comprising a multiple metal oxide wherein the multiple metal oxide comprises a catalytic metal.

The catalyst composition can be one that can be disposed on a substrate such that a minimal pressure drop increase is observed as exhaust passes through the substrate. The pressure drop when the exhaust passes through the PF increases with the amount of particulates collected in the trap. If the pressure drop is too high, the engine performance may be hampered due to the backpressure. Thus the DPF should keep the pressure drop at a minimal level at the beginning of use as well as after a large amount of particulates have been collected in the trap. A preferred pressure drop is below about 30 kPa (kilopascals) both at the beginning of use as well as during the useful lifetime of the PF.

The disclosed catalyst composition comprises a multiple metal oxide in which at least one metal is a catalytic metal, and optionally a metal aluminate. The term "multiple metal oxide" (also known as a mixed metal oxide) means bi-metallic or multi-metallic oxygen compounds, such as $Li_2PtO_3$, which are true compounds, and is not intended to embrace mere mixtures of two or more individual metal oxides such as a mixture of $Li_2O$ and $PtO$. These multiple metal oxides form a single crystalline phase material. The multiple metal oxide and the optional metal aluminate can be mixed or otherwise combined to form the catalyst composition. The multiple metal oxides can comprise a platinum (or other catalyst) containing perovskite (i.e., a single phase platinum perovskite material). Alternatively, the multiple metal oxide can comprise pyrochlores having the formula $R_2D_2O_7$, wherein R is a rare earth (lanthanide series) element and D is a catalytic metal. For example, $Lu_2Pt_2O_7$, $Nd_2Pt_2O_7$, $Gd_2Pt_2O_7$, $Pr_2Pt_2O_7$, $Sm_2Pt_2O_7$, $Eu_2Pt_2O_7$, $Tb_2Pt_2O_7$, $Dy_2Pt_2O_7$, $Ho_2Pt_2O_7$, $Y_2Pt_2O_7$, $Er_2Pt_2O_7$, $Tm_2Pt_2O_7$, $Yb_2Pt_2O_7$, $Lu_2Pt_2O_7$, $Sc_2Pt_2O_7$, and the like, as well as combinations comprising at least one of the foregoing pyrochlores, can be employed. Exemplary pyrochlores can be further found in "Synthesis of some pyrochlore-type oxides of platinum (IV) at high pressure", to H. R. Hoekstra et al., Inorganic Chemistry, Vol. 7, pp. 2553-2557 (1968), which teaches producing these pyrochlores by reacting $PtO_2$ with the rare earth oxide at temperatures of about 800° C. to about 1,600° C.

Suitable catalytic metals for the multiple metal oxide include, for example, platinum (Pt), palladium, rhodium, iridium, osmium, ruthenium, tantalum, zirconium, yttrium, cerium, nickel, copper, and the like, and combinations comprising one or more of the foregoing catalytic metals, with platinum preferred.

Suitable metals for both the multiple metal oxide and the optional metal aluminate include alkaline earth, alkali or rare earth metals such as barium, radium, strontium, calcium, magnesium, beryllium, scandium, yttrium, cerium, praseodymium, neodymium, promethium, samarium, europium, gadolinium, terbium, dysprosium, holmium, erbium, thulium, ytterbium, lutetium, potassium, sodium, lithium, rubidium, cesium, and combinations comprising one or more of the foregoing metals. Other exemplary mixed metal oxides include perovskites. For example, a single a metal oxide composition represented by the general formula, $A_{a-x}B_xMO_b$, in which A is a mixture of elements originally in the form of single phase mixed lanthamides collected from bastnasite; B is a divalent or monovalent cation; M comprises at least one element having an atomic number of 22 to 30, 40 to 51, and 73 to 80; a is 1 or 2; b is 3 when a is 1 or b is 4 when a is 2; and x is a number defined by $0 \leq x < 0.7$. For instance, the single phase perovskite materials may have the formula: (1) $A_{1-x}B_xMO_3$, and preferably x is 0 to about 0.5; and/or (2) $A_{2-x}B_xMO_4$; $A_{a-x}B_xMO_b$, in which A is a lanthamide(s) of an atomic number of 57 to 71 or, alternatively, A is a mixture of elements comprising of yttrium and lanthamide(s) of an atomic number of 57 to 71. Some exemplary perovskites are set forth in U.S. Pat. Nos. 6,352,955; 5,939,354; 6,372,686; and 5,977,017.

In one embodiment, the multiple metal oxide is substantially uniformly dispersed in a metal aluminate (i.e., the concentration of multiple metal oxide in the metal aluminate varies by less than or equal to ±5 wt % based on the total weight of the One method of preparing this catalyst is to combine a metal aluminate precursor and a catalytic metal salt and then to calcine the mixture to form a metal aluminate comprising a substantially uniformly dispersed multiple metal oxide.

The metal aluminate precursor comprises is represented by the formula $M_mAl_xO_n$, wherein m and x are greater than 0 and n is dependent on the oxidation state of the other elements. M is an alkaline earth, alkali or rare earth metal such as, for example, barium, radium, strontium, calcium, magnesium, beryllium, scandium, yttrium, cerium, praseodymium, neodymium, promethium, samarium, europium, gadolinium, terbium, dysprosium, holmium, erbium, thulium, ytterbium, lutetium, potassium, sodium, lithium, rubidium, cesium, and combinations comprising one or more of the foregoing metals.

The metal aluminate precursor, for example, can comprise an alkali metal aluminate precursor. An alkali metal aluminate precursor is preferably formed by the protocol of, for example, U.S. Pat. No. 5,614,596. For example, the alkali metal aluminate precursor can be formed by the reaction of an alkali hydroxide, aluminum hydroxide and a complexing agent. Suitable complexing agents include triethanolamine (TEA) and trisopropanolamine (TIPA). An alkali metal aluminate precursor can be formed by reacting (e.g., distilling) lithium hydroxide, aluminum hydroxide and TEA. Another alkali metal aluminate precursor can be formed by reacting (e.g., distilling) potassium hydroxide, aluminum hydroxide, and TEA. Yet another alkali metal aluminate precursor can be formed by reacting (e.g., distilling) cesium hydroxide, aluminum hydroxide, and TEA. The alkali metal aluminate precursor is preferably a polymer containing metal-triethanolamine complexes. The solution resulting from the above-described reactions is referred to as an alkali metal aluminate precursor because calcination of this solution (e.g., at temperatures of about 500° C. to about 800° C.), will result in the production of the corresponding alkali metal aluminate. Some possible alkali metal aluminates include lithium aluminate, potassium aluminate, and cesium aluminate, and combinations comprising one or more of the foregoing aluminates. Formation of an alkali metal aluminate after calcinations can be confirmed by X-ray diffraction.

The catalyst composition also comprises a catalytically active metal that reacts with and converts pollutants (e.g., unburned hydrocarbons, CO (carbon monoxide) and/or $NO_x$ (nitrous oxides) and the like) to water, $CO_2$ (carbon dioxide), $N_2$ (nitrogen) and the like. The catalytic metal reduces the concentration of at least one component of the exhaust gas. Typical catalytically active metals include platinum (Pt), palladium, rhodium, iridium, osmium, ruthenium, tantalum, zirconium, yttrium, cerium, nickel, copper, and the like, as well as oxides, alloys and combinations comprising at least one of the foregoing metals, and other catalysts, with platinum preferred.

The catalyst composition can be formed, for example, by taking a solution containing platinum nitrate and nitrates or acetates of the rare earth(s) to dryness, optionally in the presence of a gelling agent (e.g., guar gum or the like). Once dry, the material is calcined at sufficient temperatures to crystallize the desired phase, e.g., temperatures of about 400° C. to about 1,000° C. Alternatively, combustion synthesis can be employed. For example, a solution of nitrates of platinum and the basic element(s) can be combined with a solution containing an organic reducing agent (e.g., glycine, oxalyldihydrazide, and/or the like). The resultant mixture can then be pumped, preferably slowly (e.g., dropwise), into a stainless steel breaker that is heated (e.g., to about 300° C.). Water from the drops of solution evaporates rapidly on contact with the beaker, leaving a char of metal nitrate and reducing agent that reacts to provide the crystalline metal oxide, $CO_2$, water, $N_2$, and some NOx.

The catalytic metal can be added to the metal aluminate precursor in the form of a catalytic metal salt. Suitable catalytic metal salts include, for example, platinum nitrate, platinum sulfite, and platinum hydroxides such as $Pt(OH)_6$(ethanolamine)$_2$ (platinum ethanolamine hydroxide) and $Pt(NH_3)_4(OH)_2$ (platinum amino hydroxide). Platinum nitrate and platinum hydroxides are particularly preferred.

The catalyst composition comprising a metal aluminate and a substantially uniformly dispersed multiple metal oxide can be formed by calcining a metal aluminate precursor in the presence of a catalytic metal salt. Calcining can be performed, for example, on a catalyst substrate. Calcining the mixture of the metal aluminate and multiple metal oxide provides an atomically isolated, substantially uniformly dispersed catalytic metal.

An alkali metal aluminate comprising a substantially uniformly dispersed alkali metal catalytic metal oxide, for example, can be formed by heating the mixture of alkali metal aluminate precursor and catalytic metal salt. First, the mixture of the alkali metal aluminate precursor and catalytic metal salt is heated to a temperature sufficient to remove non-reacted TEA. Once the excess TEA is removed, the temperature is increased to a sufficient temperature to decompose metal triethanolamine complexes. Finally the temperature is increased to a third temperature sufficient to form the mixture of alkali metal aluminate and alkali metal catalytic metal oxide. For example, a mixture of lithium aluminate precursor and platinum nitrate can be heated up to about 150° C. to remove non-reacted TEA, then heated up to about 400° C. to decompose metal triethanolamine complexes, and finally heated up to about 450° C. to about 650° C. to form the mixture of alkali metal aluminate and alkali metal catalytic metal oxide. Heating to about 450° C. to about 650° C. is sufficient to form a mixture of alkali metal aluminate and alkali metal catalytic metal oxide as well as some unreacted catalytic metal. This mixture containing both unreacted catalytic metal and alkali metal catalytic metal oxide can be used for CDPF applications.

Optionally, the mixture of alkali metal aluminate, alkali metal catalytic metal oxide and catalytic metal can be calcined again for a sufficient time and at a sufficient temperature to convert any remaining catalytic metal to the alkali metal catalytic metal oxide, (e.g., at up to about 750° C. to about 900° C. for up to about 16 hours or so). The mixture of alkali metal aluminate and alkali metal catalytic metal oxide, which is substantially free of unreacted catalytic metal, can also be used for CDPF applications. A mixture of alkali metal aluminate and alkali metal catalytic metal oxide, which is substantially free of unreacted catalytic metal, preferably comprises less than about 5 wt % (weight percent, based on the total weight of the catalytic metal in the whole mixture) unreacted catalytic metal. Preferably, however, the mixture comprises less than about 2 wt % unreacted catalytic metal based on the total weight the catalytic metal in the whole of the mixture.

The improved method described herein provides a catalyst for the treatment of exhaust, particularly diesel soot, comprising a multiple metal oxide wherein the multiple metal oxide comprises at least one catalytic metal. The catalyst can optionally comprise a metal aluminate.

The improved method for the treatment of diesel soot described herein optionally provides a substantially uniform dispersion of multiple metal oxide in metal aluminate. For the example of an alkali metal catalytic metal oxide substantially uniformly dispersed in an alkali metal aluminate, the crystalline domain size of the alkali metal catalytic metal oxide can be calculated using the full-width-at-maximum-intensity of the (003) X-ray diffraction peak in the Scherer equation. The calculated crystalline domain size is typically less than 500 Å (Angstroms). Calcining the metal aluminate precursor/catalytic metal salt mixture as described herein, however, has the advantage of producing a substantially uniform dispersion of the catalytic metal. Substantially uniform dispersion of the multiple metal oxide wherein the multiple metal oxide comprises a catalytic metal, in the metal aluminate, produces a more effective catalyst. In addition to the above-described methods, the multiple metal oxide can also be made by impregnation of a catalytic metal salt such as platinum nitrate onto a metal aluminate powder. The resulting powder can be calcined for a sufficient time and at a sufficient temperature to produce the multiple metal oxide, for example, calcining at about 500° C. to about 800° C. for up to about 16 hours or so in air. A mixture of alkali metal aluminate and alkali metal catalytic metal oxide can also be formed by, for example, reacting an alkali metal carbonate and metallic platinum (Joint Committee of Powder Diffraction Standards (JCPDS), International Center for Diffraction, card No. 29-0820).

Referring now to FIG. 1, CDPF 10 is illustrated. The CDPF 10 comprises an outer shell 12, a retention mat 16 and a catalyst substrate 14. The CDPF 10 comprises a catalyst composition disposed on or throughout the substrate 14, which is in turn located within the shell 12. A retention mat is typically placed between the catalyst substrate and the shell.

A CDPF shell 12 is a protective metal layer that is disposed around the catalyst substrate 14 and retention mat 16. The shell is of a shape and size that is suitable to contain the catalyst and to protect it from such operating conditions as severe mechanical shocks. The choice of material for the shell depends upon the type of exhaust gas, the maximum temperature reached by the catalyst substrate, the maximum temperature of the exhaust gas stream, and the like. Suitable materials for the shell can comprise any material that is capable of resisting under-car salt, temperature and corrosion. Typically, ferrous materials are employed such as ferritic stainless steels. Ferritic stainless steels can include stainless steels such as, e.g., the 400-Series such as SS-409, SS-439, and SS-441, with grade SS-409 generally preferred.

Located between the shell 12 and the catalyst substrate 14 is a retention mat 16. The function of the mat is to hold the catalyst substrate in place and, in some instances, to insulate the shell from the heat of the substrate during operation. The mat support material can either be an intumescent material (e.g., one which contains ceramic materials, and other conventional materials such as organic binders and the like, or combinations comprising at least one of the foregoing materials, and a vermiculite component that expands with heating to maintain firm uniform compression, or non-uniform compression, if desired) or a non-intumescent material, as well as materials which include a combination of both.

The catalyst substrate 14 preferably has a size and geometry chosen to optimize the surface area in a given diesel particulate filter design. The substrate can comprise any material designed for use in a spark ignition or diesel engine environment and having the following characteristics: (1) capable of operating at temperatures up to about 600° C. or so, depending upon the device's location within the exhaust system; (2) capable of withstanding exposure to hydrocarbons, nitrogen oxides, carbon monoxide, particulate matter (e.g., soot and the like), carbon dioxide, and/or sulfur; and (3) having sufficient surface area and structural integrity to support a catalyst, if desired. Some possible materials include cordierite, silicon carbide, metal, metal oxides (e.g., alumina, and the like), glasses, and the like, and mixtures comprising at least one of the foregoing materials. Some ceramic materials include "Honey Ceram", commercially available from NGK-Locke, Inc, Southfield, Mich., and "Celcor", commercially available from Corning, Inc., Corning, N.Y. These materials can be in the form of foils, porous materials, sponges, and the like, e.g., metallic foils, open pore alumina sponges, and porous ultra-low expansion glasses.

A monolithic diesel particulate filter element can be a wall flow filter comprising honeycombed, porous crystalline ceramic (e.g. cordierite) material. Alternate cells of the honeycombed structure are preferably plugged such that exhaust gas enters in one cell, is forced through the porous walls of the cell, and then exits the structure through another cell. The size of the diesel particulate filter element depends upon the particular application.

Disposed on and/or throughout the catalyst substrate is the catalyst composition (e.g., the optional metal aluminate and the multiple metal oxide). The catalyst composition is wash coated, imbibed, impregnated, physisorbed, chemisorbed, precipitated, or otherwise applied to the catalyst substrate by such techniques as spraying, dipping or painting, for example. The multiple metal oxide composition wherein the multiple metal oxide comprises at least one catalytic metal can be employed in an amount sufficient to catalyze a reduction in concentration of at least one exhaust gas component. In addition, the catalyst comprising a multiple metal oxide can be deposited on the substrate in an amount that gives a back-pressure-drop increase of less than or equal to about 30 kPa. The catalyst composition loading density can be about 0.01 to about 0.5 g/in$^3$ (grams/cubic inch) (i.e., about 0.00061 to about 0.031 g/cm$^3$ (grams per cubic centimeter)), with about 0.1 to about 0.2 g/in$^3$ (i.e., about 0.0061 to about 0.12 g/cm$^3$) more preferred. A preferred catalytic metal (the total of both free catalytic metal and catalytic metal in the multiple metal oxide) loading density is about 0.0011 to about 0.058 g/in$^3$ (i.e., about 0.000067 to about 0.0035 g/cm$^3$) with about 0.0058 to about 0.041 g/in$^3$ (i.e., about 0.00035 to about 0.0025 g/cm$^3$) more preferred.

EXAMPLES

Example 1

Formation of an Alkali Metal Aluminate Precursor

To form the alkali metal aluminate precursor, 1.0 mole of lithium hydroxide, 1.0 mole of aluminum hydroxide, and 2 moles of triethanolamine (TEA) were mixed in a 1 L (liter) round-bottom flask with 0.7 L of ethylene glycol as a solvent. The mixture was distilled for a time sufficient to produce a clear yellow solution or sol. The yellowish solution or sol is referred to as the alkali metal aluminate precursor.

Figure 2:
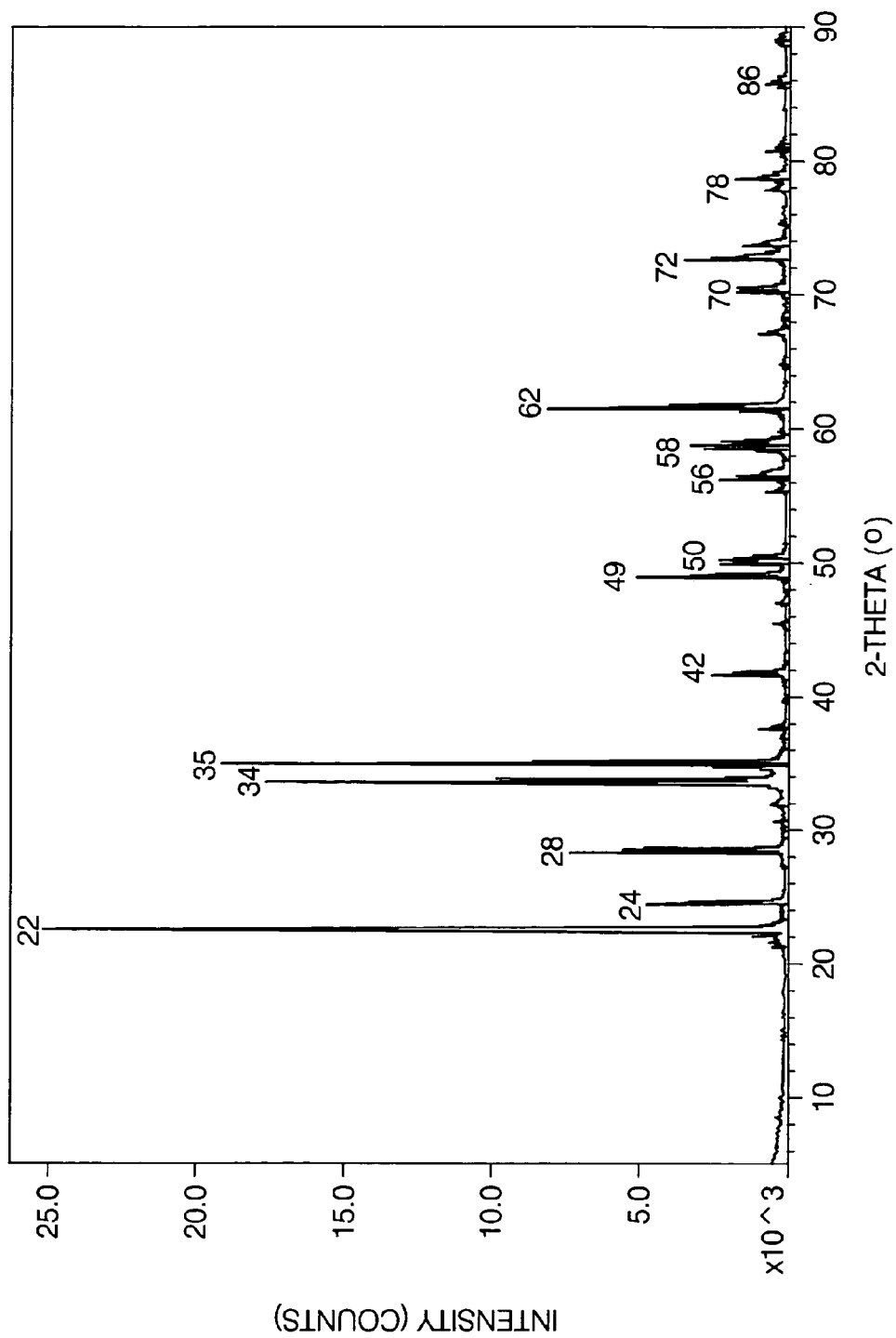
FIG. 2 shows x-ray diffraction data for lithium aluminate ($LiAlO_2$).

To verify the presence of the alkali metal aluminate precursor, the precursor was calcined at 650° C. The presence of alkali metal aluminate was confirmed by x-ray diffraction. FIG. 2 shows the x-ray diffraction data for lithium aluminate. The peaks corresponding the lithium aluminate are labeled and further listed in Table 1.

TABLE 1

X-ray diffraction 2-theta peak positions for $LiAlO_2$, $Li_2PtO_3$ and Pt.

| $LiAlO_2$ | $Li_2PtO_3$ | Pt |
|---|---|---|
| 22.962 | 18.469 | 40.000 |
| 28.586 | 19.756 | 46.243 |
| 33.928 | 35.150 | 68.000 |
| 36.649 | 43.000 | 81.286 |
| 38.000 | 47.149 | 86.010 |
| 43.123 | 54.024 | |
| 46.986 | 62.000 | |
| 50.794 | 62.890 | |
| 55.879 | 73.261 | |
| 57.478 | 75.442 | |
| 60.197 | 78.304 | |
| 66.870 | 79.867 | |
| 67.360 | 81.336 | |
| 71.090 | 82436 | |
| 72.543 | | |

TABLE 1-continued

X-ray diffraction 2-theta peak positions for $LiAlO_2$, $Li_2PtO_3$ and Pt.

| $LiAlO_2$ | $Li_2PtO_3$ | Pt |
|---|---|---|
| 72.608 | | |

Example 2

First Formation of an Alkali Metal Catalytic Metal Oxide (Black Powder)

Figure 3:
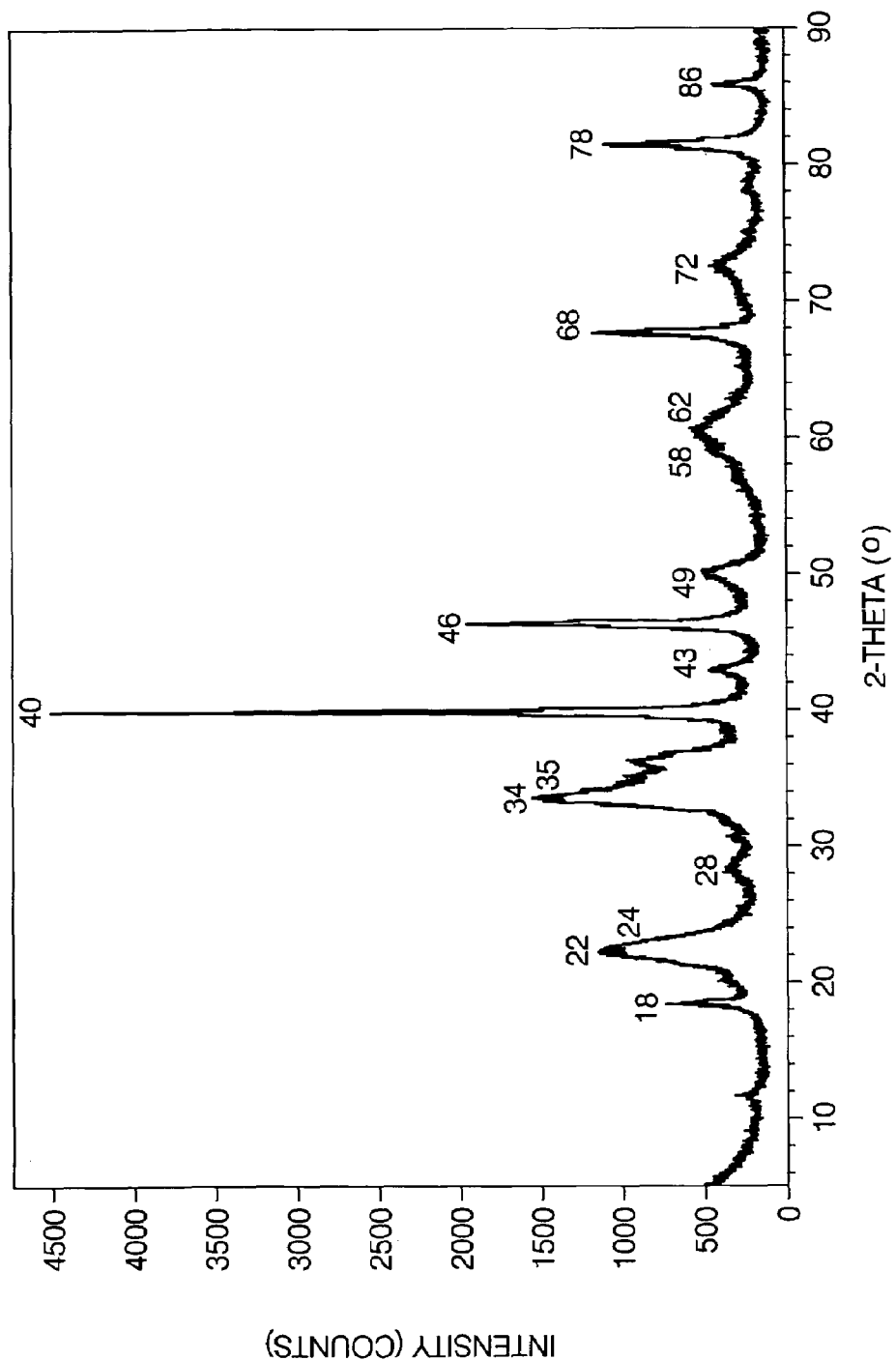
FIG. 3 shows x-ray diffraction data for lithium aluminate, lithium platinum oxide ($LiPtO_3$), and platinum.

500 g of the alkali metal aluminate precursor solution with 20 wt % of volatile free solid or sol was then mixed with 58.3 g of aqueous platinum nitrate solution (12 wt % of Pt). The resulting viscous mixture was then poured into a ceramic calcination dish and put into a calcination furnace. The temperature was ramped at 5° C./min until it reached 150° C. The mixture was then incubated for 3 hours to remove the unreacted TEA. The temperature was then increased to 400° C. for 2 hours to decompose the metal triethanolamine complexes. The temperature was then increased to 540° C. for 4 hours. A powder with metallic shining black color was obtained. X-ray diffraction of the black powder indicates the presence of poorly crystallized $LiAlO_2$, $Li_2PtO_3$ and metallic Pt. FIG. 3 shows the x-ray diffraction data for the black powder containing lithium aluminate ($LiAlO_2$), lithium platinum oxide ($LiPtO_3$) and platinum. The peaks corresponding to lithium aluminate ($LiAlO_2$), lithium platinum oxide ($LiPtO_3$), and platinum are labeled in FIG. 3 and listed in Table 1.

Example 3

Second Formation of an Alkali Metal Catalytic Metal Oxide (Yellow Powder)

Figure 4:
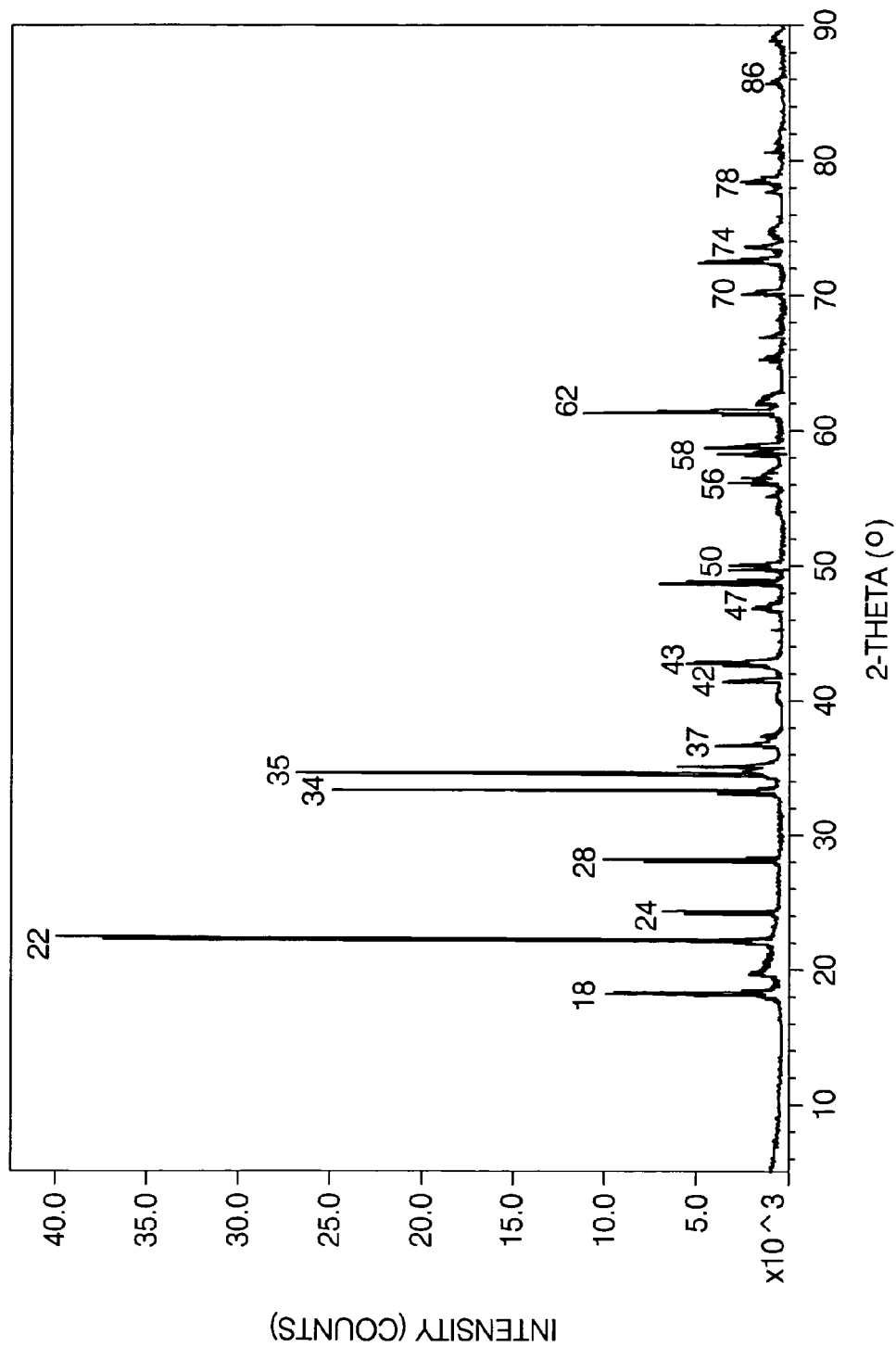
FIG. 4 shows x-ray diffraction data for lithium aluminate and lithium platinum oxide.

The black powder from Example 2 was then calcined at 800° C. for 16 hours. The resulting powder was bright yellow. X-ray diffraction indicates the presence of $LiAlO_2$ and $Li_2PtO_3$ with only sharp diffraction lines indicating the presence of well-defined crystals. The metallic Pt present in the black powder disappeared. FIG. 4 shows x-ray diffraction data for lithium aluminate ($LiAlO_2$) and lithium platinum oxide ($LiPtO_3$). The peaks corresponding to lithium aluminate ($LiAlO_2$) and lithium platinum oxide ($LiPtO_3$) are labeled in FIG. 4 and listed in Table 1.

Example 4

Properties of an Alkali Metal Aluminate With Substantially Uniformly Dispersed Alkali Metal Catalytic Metal Oxides.

TGA (Thermal Gravimetric Analysis) studies show that soot ignites at 366° C. for the black powder and 372° C. for the yellow powder. The soot ignition temperature was measured on a TGA instrument. The soot collected from an Opel diesel engine was dry-mixed with the alkali metal aluminate comprising a substantially uniformly dispersed alkali metal catalytic metal oxide in a ratio of 1 to 1 (by wt). The mixture was ground with a pestle in a mortar for maximum blending. Then 15 mg of the mixture was loaded on a TGA sample bucket for analysis in a stream of air. The onset temperature for beginning of weight loss was used as the soot ignition temperature.

Comparative Example 5

In order to combust the solid-form soot efficiently, it would be beneficial to have the soot closely contact the solid-form catalyst. If the solid catalyst would tend to melt with low volatility, then the catalyst would be suitable for passive soot combustion. Partial melting behavior for the alkali metal catalytic metal oxide and alkali metal aluminate was observed after TGA analysis up to 800° C. Because $LiAlO_2$ melts at 1,650° C., the low melting behavior of the mixture is likely due to the presence of $Li_2PtO_3$. This partial melting behavior is a strong indication that the alkali metal catalytic metal oxide highly dispersed in the alkali metal aluminate phase lowered the melting point of each individual phase. As shown in Table 2, the alkali metal aluminate, and alkali metal catalytic metal oxide composition can decrease the soot ignition temperature by greater than or equal to 10° C., preferably greater than or equal to 50° C., and in some cases greater than or equal to 100° C. This melting point lowering provides closer contact with solid-form soot resulting in significant lowering of the catalytic soot ignition temperature.

TABLE 2

TGA analysis of catalyst compositions

| Composition | Soot ignition temperature, ° C. |
|---|---|
| Black powder | 366 |
| Yellow powder | 372 |
| Pt catalyst made using Pt nitrate | 392 |
| Pt catalyst made using sulfate | 470 |
| Uncatalyzed | 620 |

The catalyst composition for a CDPF disclosed herein comprises a multiple metal oxide wherein the multiple metal oxide comprises at least one catalytic metal, optionally dispersed in a metal aluminate. Without being held to theory, it is believed that a catalytic metal oxide is rendered more basic when it is in the form of a multiple metal oxide. When the catalytic metal oxide is more basic, the catalytic metal is rendered more nucleophilic. Because the oxidized catalytic metal is a terminal receptor for electrons, it is hypothesized that the oxygen in the multiple metal oxide can attack and oxidize the carbon and carbonaceous material in the soot (i.e., the reducing agent).

When the multiple metal oxide is substantially uniformly dispersed in the metal aluminate, the catalytic metal is maintained in an atomically isolated form, thus preventing catalytic metal sintering. The atomic isolation and substantially uniform dispersion of the catalytic metal can result in lowering of the soot ignition temperature by greater than or equal to about 50° C., with a reduction of greater than about 100° C. often obtained, as compared to other catalysts (e.g., lowering the ignition temperature of diesel soot from 470° C. to 366° C.). Preferably, the ignition temperature of the soot is less than or equal to 385° C., with less than or equal to about 375° C. more preferred, and less than or equal to about 365° C. even more preferred. Lowering the ignition temperature of the diesel soot is important for a passive DPF, that is, a DPF that does not require exposure to increased external temperatures to burn off soot. The catalyst comprising a multiple metal oxide and an optional metal aluminate enables the use of a low-back-pressure-drop CDPF.

An additional feature of the catalyst composition disclosed herein is that the catalytic metal in the form of a multiple metal oxide maintains its catalytic activity in the multiple metal oxide complex. Not to be limited by theory, it has been discovered that oxidized platinum is catalytically active in a basic oxide matrix (e.g., lithium platinate is more active than platinum metal). In a particulate filter environment (e.g., a diesel particulate filter during use), the conditions are bulk oxidizing (i.e., the environment is generally an oxidizing environment (air/fuel ratio of about 20 to about 50)), yet soot ignition can be achieved at reduced temperatures (e.g., less than or equal to 390° C.).

While the disclosure has been described with reference to an exemplary embodiment, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

What is claimed is:

1. A particulate filter, comprising:
   a housing; and
   a substrate disposed within the housing, the substrate comprising a catalyst composition comprising a single crystalline phase multiple metal oxide comprising platinum, wherein the substrate is designed such that gas flowing through the substrate, passes through a walls in the substrate prior to exiting the substrate.

2. The particulate filter of claim 1, wherein the multiple metal oxide comprises pyrochlores having the formula $R_2D_2O_7$, wherein R comprises a rare earth element, and D is the Pt.

3. The particulate filter of claim 2, wherein R is selected from the group consisting of praseodymium, neodymium, promethium, samarium, europium, gadolinium, terbium, dysprosium, holmium, erbium, thulium, yttrium, scandium, ytterbium, and lutetium.

4. The particulate filter of claim 1, wherein the multiple metal oxide comprises a perovskite.

5. The particulate filter of claim 4, wherein the perovskite has the formula, $A_{a-x}B_xMO_b$, wherein A is a mixture of elements in the form of single phase mixed lanthamides, B is a divalent or monovalent cation, M is Pt; a is 1 or 2; b is 3 when a is 1 or b is 4 when a is 2; and x is 0 to 0.7.

6. The particulate filter of claim 1, wherein the multiple metal oxide further comprises a metal selected from the group consisting of barium, radium, strontium, calcium, magnesium, beryllium, scandium, yttrium, cerium, praseodymium, neodymium, promethium, samarium, europium, gadolinium, terbium, dysprosium, holmium, erbium, thulium, ytterbium, lutetium, sodium, rubidium, and mixtures comprising one or more of the foregoing metals.

7. The particulate filter of claim 1, wherein the catalyst composition further comprises a metal aluminate.

8. The particulate filter of claim 7, wherein the metal aluminate further comprises a metal selected from the group consisting of barium, radium, strontium, calcium, magnesium, beryllium, scandium, yttrium, cerium, praseodymium, neodymium, promethium, samarium, europium, gadolinium, terbium, dysprosium, holmium, erbium, thulium, ytterbium, lutetium, sodium, rubidium, and mixtures comprising one or more of the foregoing metals.

9. The particulate filter of claim 8, wherein the multiple metal oxide is substantially uniformly dispersed in the metal aluminate.

10. The particulate filter of claim 1, wherein the catalytic metal is loaded on the substrate at about 0.00061 to about 0.031 grams per cubic centimeter.

11. A process for treating diesel soot, comprising:
introducing a gas stream comprising soot to a particulate filter, wherein the particulate filter comprises a housing and a substrate disposed within the housing, wherein the substrate comprising a catalyst composition comprising a single crystalline phase multiple metal oxide comprising platinum;
passing the gas stream through the substrate, wherein the gas stream passes through a wall in the substrate and contacts the catalyst composition prior to exiting the substrate; and
removing soot from the gas stream.

12. The process of claim 11, wherein the multiple metal oxide further comprises pyrochlores having the formula $R_2D_2O_7$, wherein R comprises a rare earth element, and D is the Pt.

13. The process of claim 12, wherein R is selected from the group consisting of praseodymium, neodymium, promethium, samarium, europium, gadolinium, terbium, dysprosium, holmium, erbium, thulium, yttrium, scandium, ytterbium, and lutetium.

14. The process of claim 11, wherein the multiple metal oxide comprises a perovskite.

15. The process of claim 14, wherein the perovskite has the formula, $A_{a-x}B_xMO_b$, wherein A is a mixture of elements in the form of single phase mixed lanthamides, B is a divalent or monovalent cation, M is Pt; a is 1 or 2; b is 3 when a is 1 or b is 4 when a is 2; and x is 0 to 0.7.

16. The process of claim 11, wherein the multiple metal oxide comprises a metal selected from the group consisting of barium, radium, strontium, calcium, magnesium, beryllium, scandium, yttrium, cerium, praseodymium, neodymium, promethium, samarium, europium, gadolinium, terbium, dysprosium, holmium, erbium, thulium, ytterbium, lutetium, sodium, rubidium, and mixtures comprising one or more of the foregoing metals.

17. The process of claim 11, wherein the catalyst composition further comprises a metal aluminate.

18. The process of claim 16, wherein the metal aluminate further comprises a metal selected from the group consisting of barium, radium, strontium, calcium, magnesium, beryllium, scandium, yttrium, cerium, praseodymium, neodymium, promethium, samarium, europium, gadolinium, terbium, dysprosium, holmium, erbium, thulium, ytterbium, lutetium, sodium, rubidium, and mixtures comprising one or more of the foregoing metals.

19. The process of claim 18, wherein the multiple metal oxide is substantially uniformly dispersed in the metal aluminate.

20. The process of claim 11, further comprising igniting the soot at a temperature of less than or equal to 385° C.

21. The process of claim 20, wherein the temperature is less than or equal to about 375° C.

22. The process of claim 21, wherein the temperature is less than or equal to about 365° C.

* * * * *